United States Patent
Kimura (10) Patent No.: US 7,079,473 B2
(45) Date of Patent: Jul. 18, 2006

(54) OBJECTIVE LENS, OPTICAL PICKUP APPARATUS AND RECORDING REPRODUCING APPARATUS

(75) Inventor: Tohru Kimura, Hachioji (JP)

(73) Assignee: Konica Corporation, Tokyo (JP)

( * ) Notice: Subject to any disclaimer, the term of this patent is extended or adjusted under 35 U.S.C. 154(b) by 507 days.

(21) Appl. No.: 10/465,849

(22) Filed: Jun. 20, 2003

(65) Prior Publication Data

US 2003/0235138 A1   Dec. 25, 2003

(30) Foreign Application Priority Data

Jun. 25, 2002  (JP)  ............................. 2002-184249

(51) Int. Cl.
   *G11B 7/00*   (2006.01)

(52) U.S. Cl. ........................... 369/112.24; 369/112.25; 369/112.26; 369/44.23; 359/717; 359/719

(58) Field of Classification Search ............... None
   See application file for complete search history.

(56) References Cited

U.S. PATENT DOCUMENTS

| 6,058,095 | A  | * | 5/2000  | Yamamoto et al. | .... | 369/112.23 |
| 6,307,687 | B1 | * | 10/2001 | Nishikawa       | .... | 359/814    |
| 6,353,588 | B1 | * | 3/2002  | Ori             | .... | 369/112.24 |
| 2002/0012313 | A1 | * | 1/2002 | Kimura et al.  | .... | 369/112.08 |

FOREIGN PATENT DOCUMENTS

| EP | 0 863 502 A2  | 9/1998 |
| JP | 10123410      | 5/1998 |
| JP | 11190818      | 7/1999 |
| WO | WO 02/27715 A1 | 4/2002 |

OTHER PUBLICATIONS

European Search Report.

* cited by examiner

*Primary Examiner*—Thang V. Tran
*Assistant Examiner*—Tawfik Goma
(74) *Attorney, Agent, or Firm*—Finnegan, Henderson, Farabow, Garrett & Dunner, L.L.P.

(57) ABSTRACT

An objective lens for use in an optical pickup apparatus has two positive lenses of a first lens arranged at a light source side and a second lens arranged at an information recording medium side and the objective lens comprises a first surface being a light source side optical surface of the first lens and a third surface being a light source side optical surface of the second lens, and at least two optical surfaces including the first surface and the third surface are made to be an aspherical surface respectively, and the objective lens satisfies the following formulas:

$NA \geq 0.8$ $1.2\ mm > f > 0.3\ mm$ $-0.06 > \Delta SAG > -0.24$ $\Delta SAG = (X1' - X3')/(NA^4 \cdot f \cdot (1+|m|))$ $X1' = X1 \cdot (N1-3)^{3}/f_1$ $X3' = X3 \cdot (N2-1)^{3}/f_2$.

9 Claims, 5 Drawing Sheets

OBJECTIVE LENS, OPTICAL PICKUP APPARATUS AND RECORDING REPRODUCING APPARATUS

BACKGROUND OF THE INVENTION

The present invention relates to an objective lens, an optical pickup device and a recording and reproducing apparatus, all for conducting at least one of recording and reproducing of information for an optical information recording medium.

Researches and development have been advanced in recent years for a novel high density optical disk system employing a light source of a violet semiconductor laser emitting light with a wavelength of about 400 nm and an objective lens whose numerical aperture (NA) has been enhanced up to 0.85. As an example, in the case of an optical disk having a numerical aperture of 0.85 and light source wavelength of 405 nm (hereinafter called "high density DVD), information of 20–30 GB per one surface can be recorded on an optical disk having a diameter of 12 cm which is identical to that of DVD (numerical aperture 0.6, wavelength of light source 650 nm and storage capacity 4.7 GB).

When a violet semiconductor laser emitting light of a short wavelength of about 400 nm is used as a light source, in this case, chromatic aberration caused on an objective lens is a problem. In an optical pickup device, chromatic aberration of an objective lens is considered not to be a problem because a laser beam emitted from a semiconductor laser is generally of a single wavelength (single mode). Actually, however, there is caused mode hopping in which a central wavelength is changed instantaneously by several nanometers by temperature changes and output changes. Since the mode hopping is a wavelength change occurring instantaneously which cannot be followed by a focusing mechanism of an objective lens, defocusing component corresponding to an amount of movement of an image forming position is added if chromatic aberration of the objective lens is not corrected, thus, light-converging power of the objective lens is deteriorated.

Since dispersion of general lens material used for an objective lens is not so great in 600 nm–800 nm representing a wavelength area for infra-red semiconductor laser and red semiconductor laser, deterioration of light-converging power of an objective lens caused by mode hopping was not a problem for CD and DVD.

However, dispersion of lens material is remarkably great in the vicinity of 400 nm representing a wavelength area of a violet semiconductor laser, therefore, an image forming position of an objective lens is shifted greatly even by a wavelength change I a mere several nanometers. In high density DVD, therefore, when mode hopping takes place on a light source of a violet semiconductor laser, light-converging power of the objective lens is deteriorated greatly, resulting in a fear that recording and reproducing are not carried out stably.

Incidentally, in the case of an optical pickup device, plastic lenses are commonly used as an objective lens because the plastic lens is advantageous for mass production. However, it has been known that the refractive index of the plastic lens is greater than that of a glass lens by about two figures.

When ambient temperature for the objective lens made by plastic material rises, and the refractive index of the objective lens is changed, spherical aberration of the objective lens is deteriorated. Since an amount of deterioration of the spherical aberration caused by the change of the refractive index is proportional to the fourth power of the numerical aperture of the objective lens, when an objective lens with numerical aperture of 0.85 used for high density DVD is made to be a plastic lens, a range of usable temperatures is narrowed remarkably to be a problem in practical use.

Hereupon, deterioration of spherical aberration caused by chromatic aberration of an objective lens and by refractive index changes is generated in proportion to a focal length of the objective lens. Therefore, if the focal length of the objective lens is made short for the problems mentioned above, chromatic aberration of the objective lens and deterioration of spherical aberration caused by refractive index changes can be controlled to be small, even when a violet semiconductor laser having a short wavelength and a plastic objective lens having a high numerical aperture are used.

Incidentally, the preferable one for realizing an objective lens having a numerical aperture of 0.85 is a two-group objective lens wherein the refracting power of an optical surface for a ray of light is divided into four surfaces, sensitivity for manufacturing error of each lens is small and manufacturing is easy. A lens having a high numerical aperture and structured by 2 groups is disclosed by Tokukaihei 10-123410, Tokukaihei 11-190818 and Tokukai 2000-20640. Further, an example to make a focal length shorter is also disclosed. However, there are the following problems in prior art.

As stated above, the smaller a focal length of an objective lens is, the smaller the deterioration of spherical aberration caused by refractive index changes is controlled, however, if the focal length is made small in a two-group objective lens, there are feared the following problems;

(1) a distance between the final surface of an objective lens and an optical disk (so-called the working distance) becomes too small to increase possibility of collision between an optical disk and an objective lens, and (2) an outside diameter of each lens constituting a two-group objective lens, in particular, of a lens arranged to be closer to an optical disk, becomes too small, to make handling of each lens difficult in a process of incorporating each lens and to increase man-hour for each processing.

Namely, it is not preferable, from viewpoints of securing the working distance and of incorporating each lens, that a focal length of the two-group objective lens is made to be too small.

Further, in an optical pickup device, making a focal length of an objective lens to be small is disadvantageous for image height characteristics. The reason for the foregoing is that when trying to obtain an image height identical to that for the objective lens whose focal length is relatively great, an incident angle to an objective lens whose focal length is relatively small becomes great. The greater the incident angle is, the more astigmatism and coma deteriorate. Therefore, from the viewpoint of image height characteristics, it is not preferable that a focal length of an objective lens is too small.

SUMMARY OF THE INVENTION

The invention has been achieved in view of the circumstances mentioned above, and its object is to provide a two-group objective lens which has a numerical aperture of 0.8 and is capable of being applied to an optical pickup device employing a light source with a short wavelength of about 400 nm, wherein a sufficient working distance can be secured even when a focal length is made small for controlling chromatic aberration to be small, and sensitivity for manufacturing error is low to make manufacturing to be easy, and image height characteristics are excellent.

Further, the object of the invention is to provide an optical pickup device carrying the aforementioned objective lens and to provide a recording and reproducing apparatus equipped with the optical pickup device.

An objective lens of the invention is represented by one to be used for on optical pickup device for recording Information on an optical information recording medium by converging light emitted from a light source on an information recording surface of the optical information recording medium and/or reproducing information recorded on an optical information recording medium, wherein there are provided two positive lenses including a first lens arranged on the light source side and a second lens arranged on the optical information recording medium side, and at least two optical surfaces including the first surface representing an optical surface on the light source side of the first lens and the third surface representing an optical surface on the light source side of the second lens are made to be an aspheric surface, and following expressions are satisfied;

$$NA \geq 0.8 \quad (1)$$

$$1.2 \text{ mm} > f > 0.3 \text{ mm} \quad (2)$$

$$-0.06 > \Delta SAG > -0.24 \quad (3)$$

$$\Delta SAG = (X1' - X3')/(NA^4 \cdot f \cdot (1+|m|)) \quad (4)$$

$$X1' = X1 \cdot (N1-1)^3/f_1 \quad (5)$$

$$X3' = X3 \cdot (N2-1)^3/f_2 \quad (6)$$

under the following conditions;

NA: numerical aperture on the image side of the prescribed objective lens that is needed for conducting recording and/or reproducing for the optical information recording medium, f: focal length of the objective lens (mm), X1: distance in the optical axis direction (mm) between a plane that is perpendicular to the optical axis and is in contact with an apex of the first surface and that first surface on the outermost effective diameter (position on the first surface where marginal light with NA enters), and its sign is positive when measuring toward the second lens from the reference of the tangential plane and is negative when measuring in the opposite way, X3: distance in the optical axis direction (mm) between a plane that is perpendicular to the optical axis and is in contact with an apex of the third surface and that third surface on the outermost effective diameter (position on the third surface where marginal light with NA enters), and its sign is negative when measuring toward the first lens from the reference of the tangential plane and is positive when measuring in the opposite way, m: image forming magnification of the objective lens, N1: refractive index of the first lens for the wavelength to be used, N2: refractive index of the second lens for the wavelength to be used $f_1$: focal length (mm) of the first lens, and $f_2$: focal length (mm) of the second lens.

In the course of solving the problems above, a design examination was conducted with a parameter of a focal length for the two-group objective lens having a numerical aperture of 0.85, while considering so that (A) a tolerance for eccentricity between respective lenses, optical surfaces in each lens, (B) a tolerance for eccentricity between respective lenses, (C) a tolerance of an incident angle of an incident light flux and (D) a working distance may secure respectively (A) ±0.005 mm, ±0.1°, (B) ±0.030 mm, ±0.1° (C) ±1° and (D) 0.05 mm.

Incidentally, tolerance for (A) above is on the standard of accuracy in the case of manufacturing each lens through mold forming employing a metal mold, and a value (±0.005 mm, ±0.10) corresponding to the tolerance is one attained sufficiently by the present metal mold processing technology or by the mold forming technology.

Figure 1:
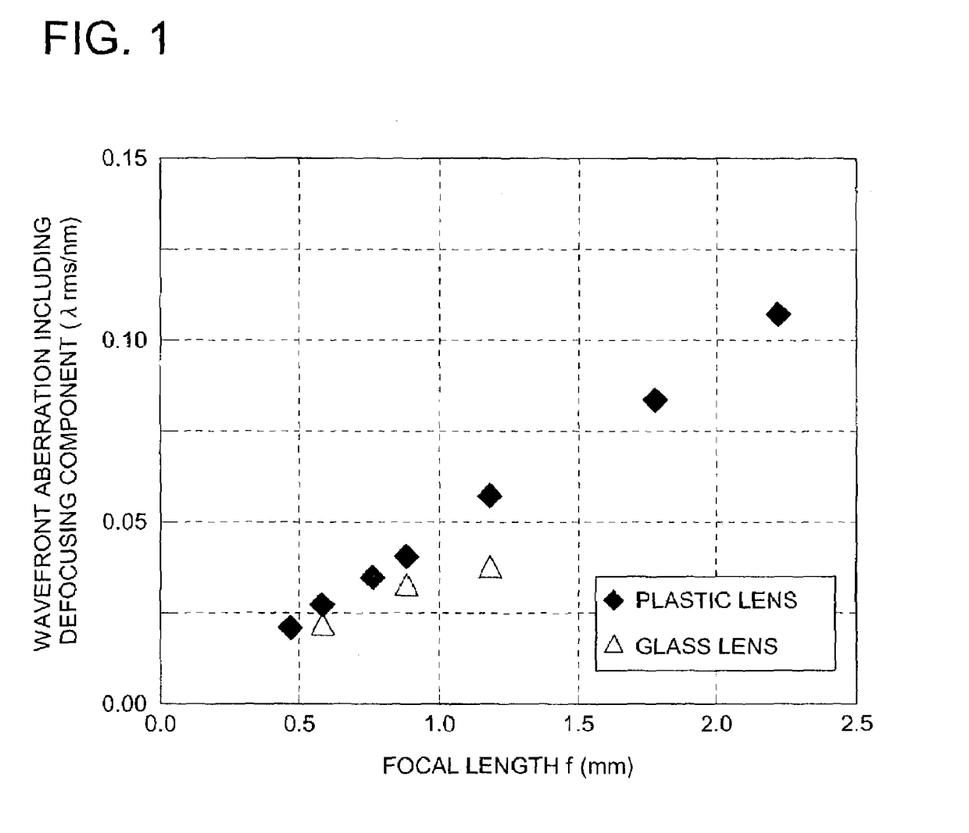
FIG. 1 is a diagram in which a change of wavefront aberration including a defocusing component is plotted as a function of a focal length, when a wavelength of light entering the objective lens is changed, with respect to the two-group objective lens which has been subjected to design examination.

A change of wavefront aberration including a defocusing component of an objective lens in the case of a change of the wavelength of light entering the objective lens with respect to the two-group objective lens which has been subjected to design examination is plotted on FIG. 1 as a function of a focal length. Though it is considered that a wavelength is changed by about 1 nm by mode hopping on a violet semiconductor laser, FIG. 1 tells that wavefront aberration including a defocusing component in the case of a change of a wavelength of 1 nm becomes 0.07 λrms or less representing Marechal's criterion, when the focal length is made to be smaller than 1.2 mm.

On the other hand, for controlling wavefront aberration including a defocusing component in the case of a change in a wavelength to be small, the smaller focal length is more advantageous. However, if the focal length is made to be too small, it becomes difficult to secure sufficient tolerance for errors of (A)–(C), while securing a sufficient working distance as stated above. Further, if the focal length is made to be too small, handling of each lens is difficult in a process of assembling each lens, because an outside diameter of each lens becomes small.

Therefore, a value of the lower limit of the focal length with which the sufficient tolerance for errors of (A)–(C) can be secured while securing a sufficient working distance of 0.03 mm was made to be 0.3 mm, and the condition of 1.2 mm>f>0.3 mm (2) was determined as a preferable range of the focal length of two-group objective lens whose numerical aperture satisfies the expression (1).

Incidentally, in the objective lens having a high numerical aperture and structured by 2 groups, it is effective for correcting aberration properly to make at least two optical surfaces including the first and third surfaces to be an aspheric surface. In the lens design, it is necessary to determine a shape of the aspheric surface so that a difference of optical paths for the first and third surfaces for each beam of light with incident height may take an appropriate value, for lowering sensitivity against errors of the (A)–(C), and thereby for making objective lenses to be easy for manufacturing, and further for making an optical pickup device carrying the objective lens to be easy for manufacturing. To be concrete, each coefficient of aspheric surface is controlled so that a value of ΔSAG representing a difference between aspheric surface shape X1' of the first surface and aspheric surface shape X3' of the third surface each being standardized by a refractive index and a focal length of each lens may be within an appropriate range.

Figure 2:
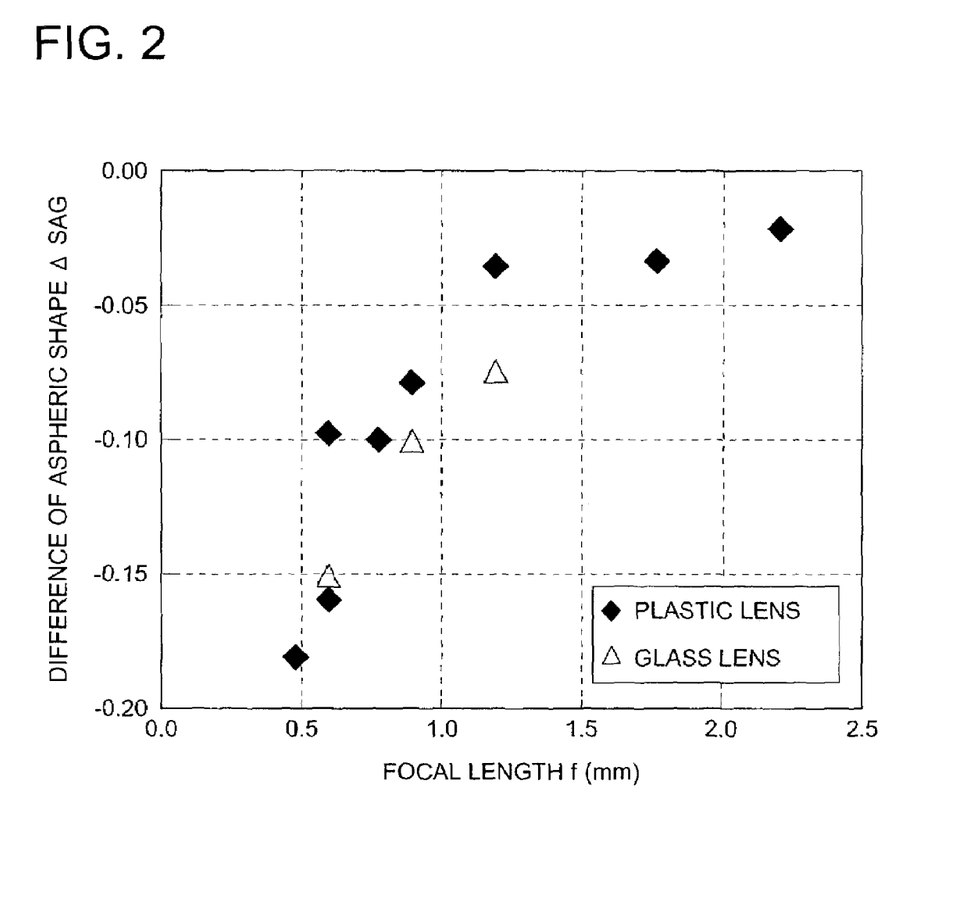
FIG. 2 is a diagram in which a difference (ΔSAG) of an aspheric surface form is plotted as a function of a focal length of the objective lens, with respect to the two-group objective lens shown in FIG. 1.

In FIG. 2, each ΔSAG is plotted as a function of a focal length of the objective lens with respect to the two-group objective lens which has been subjected to design examination.

Based on FIG. 2, the following condition was determined for securing sufficient manufacturing tolerance in the two-group objective lens whose focal length satisfies expression (2).

$$-0.06 > \Delta SAG > -0.24 \quad (3)$$

When a value of ΔSAG is greater than the lower limit of expression (3), a possibility of collision between the objective lens and an optical information recording medium is lowered, because a working distance does not become too small. It is further possible to improve efficiency for incorporating the first lens and the second lens, because astigmatism caused by deviation of optical axes of the first lens and the second lens does not become too large. Further, it is possible to lower coma caused by deviation of the optical axis of an optical surface of the second lens, because the degree of meniscus of the second lens does not become too great, and it is possible to improve production efficiency for the second lens. Further, it is possible to lower coma caused by deviation of the optical axis of an optical surface of the first lens, because the curvature of the first surface does not become too small, and it is possible to improve production efficiency for the first lens.

On the other hand, when a value of ΔSAG is smaller than the upper limit of expression (3), the lens thickness on the optical axis of the first lens does not become too great, which makes an objective lens to be compact, which is advantageous from the viewpoint of downsizing of an optical pickup device. Further, a curvature of the third surface does not become too small, and thereby, an apparent angle representing an angle formed by a normal line on the aspheric surface on the periphery and an optical axis does not become too large, which makes metal mold processing to be conducted accurately.

To attain the aforesaid functions more, it is preferable that a value of ΔSAG satisfies the following condition.

$$-0.07 > \Delta SAG > -0.20 \quad (3')$$

It is preferable that the objective lens of the invention further satisfies the following conditions;

$$WD \geq 0.03 \text{ mm} \quad (7)$$

$$0.17 > WD/f > 0.03 \quad (8)$$

(wherein, WD is a distance between the objective lens and the optical information recording medium (working distance) or a distance on the optical axis between the fourth surface being an optical information recording medium side surface of the second lens and a surface of the optical information recording medium.)

Even in the case of an objective lens whose focal length is small, it is possible to prevent collision between the objective lens and an optical information recording medium by satisfying expression (7), and it is possible to lower coma caused by optical axis deviation of an optical surface of the first lens and to lower coma caused by optical axis deviation of an optical surface of the second, by satisfying expression (8) for the ratio of the working distance to the focal length, thus, it is possible to improve production efficiency for the first and second lenses.

It is preferable that a designed wavelength is shorter than 450 nm in the objective lens in the invention. In the wavelength area where the wavelength is shorter than 450 nm, the objective lens of the invention can control occurrence of longitudinal chromatic aberration caused by dispersion of lens material to be small, because the focal length satisfies expression (2), although dispersion of lens material for wavelength change becomes great. As a result, by making the objective lens of the invention to be housed in the optical pickup device having a violet semiconductor laser as a light source, excellent light-converging power can be maintained even when mode hopping is caused by the laser light source.

It is preferable that the following expression is satisfied by the objective lens of the invention;

$$0.4 > \beta_{L2} > 0.2 \quad (9)$$

(wherein, $\beta_{L2}$ is an image forming magnification of the second lens.) Expression (9) is related to the preferable range of image forming magnification of the second lens, when sufficient tolerance for errors of (A)–(C) are secured in the two-group objective lens whose focal length satisfies expression (2). In this case, image forming magnification $\beta_{L2}$ of the second lens is defined by the following expression (11), when an incident angle of upper marginal light on the optical surface of the second lens on the light source side is represented by $\theta_{S3}$ and an emergent angle of upper marginal light on the optical surface of the second lens on the optical information recording medium side is represented by $\theta_{S4}$;

$$\beta_{L2} = \theta_{S3}/\theta_{S4} \quad (11)$$

wherein, $\theta_{S3}$ and $\theta_{S4}$ are measured on the base represented by an optical axis, and its sign is positive when its direction is clockwise, while, it is negative when its direction is counterclockwise.

When a value of $\beta_{L2}$ is greater than the lower limit of expression (9), a lens thickness of the first lens on an optical axis does not become too great, and it is possible to make an objective lens to be compact, which is advantageous from the viewpoint of downsizing of an optical pickup device. In addition, since the curvature of the third surface does not become too small, an estimated angle representing an angle formed by a normal line on an aspheric surface on a periphery and by an optical axis does not become too great, and metal mold processing can be conducted accurately.

On the other hand, when a value of $\beta_{L2}$ is smaller than the upper limit of expression (9), since a working distance does not become too small, it is preferable and it is possible to reduce more possibility of collision of an objective lens and an optical information recording medium. Further, efficiency of assembling the first lens and the second lens can be improved because astigmatism generated by deviation of optical axes between the first lens and the second lens does not become too great. Further, it is possible to reduce an amount of coma generated by optical axis deviation of the second lens and thereby to improve production efficiency of the second lens, because the degree of meniscus of the second lens does not become too great. Further, it is possible to reduce an amount of coma generated by optical axis deviation of the first lens and thereby to improve production efficiency of the first lens, because the curvature of the first surface does not become too small.

It is further preferable that the objective lens of the invention satisfies the following expression.

$$4.0 > f_1/f_2 > 2.0 \quad (10)$$

Expression (10) represents conditions to make power distribution for the first lens and the second lens to be appropriate and to secure sufficient tolerance for errors of the aforesaid (A)–(C). By determining power distribution for the first lens and the second lens so that the upper limit of expression (10) may not be exceeded, the curvature of the third surface does not become too small, and thereby an estimated angle representing an angle formed by a normal line on an aspheric surface on a periphery and by an optical axis does not become too great, and metal mold processing can be conducted accurately, and it is further possible to improve efficiency of assembling the first lens and the second lens because aberration generated by optical axis deviation between the first lens and the second lens does not become too great.

On the other hand, by determining power distribution for the first lens and the second lens so that the lower limit of expression (10) may not be exceeded, it is possible to control astigmatism and coma which are generated when a light flux enters an objective lens obliquely. It is therefore possible to ease accuracy for installation of a light source and accuracy for installation of optical elements such as a prism and a polarization beam splitter.

It is preferable that each of the first lens and the second lens of the objective lens of the invention is further a plastic lens. Since injection molding of a plastic lens is easy, mass production of objective lenses having stable quality is possible. Further, it is possible to reduce the number of parts of the objective lens, because a holding member that holds each of the first and second lenses can be formed to be solid with each lens.

Though a refractive index of a plastic lens is changed greatly by an influence of changes in ambient temperatures, it is possible, for the objective lens of the invention, to control deterioration of spherical aberration caused by changes of refractive index to be small even when the objective lens is a plastic lens having a high numerical aperture, because the focal length of the objective lens of the invention satisfies expression (2). As a result, by making the objective lens of the invention to be housed in the optical pickup device, excellent light-converging power can be maintained even when ambient temperatures are changed.

Since the objective lens of the invention is a lens with a small diameter whose focal length satisfies expression (2), energy of a laser beam entering a unit area of an optical surface is greater relatively compared with an objective lens having a large focal length. Therefore, by making the objective lens of the invention to be a glass lens having high lightfastness against light with a short wavelength, it is possible to provide objective lenses which are highly reliable, as an objective lens for an optical pickup device employing a light source with short wavelength such as a violet semiconductor laser. Though specific gravity of a glass lens is greater, compared with that of a plastic lens, the objective lens of the invention has a short focal length and thereby is small in volume, even it is a glass lens, resulting in no load on an actuator for focusing.

An optical pickup device of the invention is one for recording information on an optical information recording medium by converging, with an objective lens, light emitted from a light source generating light of wavelength shorter than 450 nm on an information recording surface of the optical information recording medium, and/or for reproducing information recorded on an optical information recording medium, wherein the objective lens of the invention is housed as the aforementioned objective lens.

In this optical pickup device, it is possible to control occurrence of longitudinal chromatic aberration to be small even when a violet semiconductor laser is used as a light source, because a focal length of the objective lens satisfies expression (2), and it is further possible to control deterioration of spherical aberration cause by an influence of temperature changes to be small, even when an objective lens is made to be a plastic lens. It is therefore possible to maintain excellent light-converging power constantly in the optical pickup device.

Further, it is possible to prevent collision with an optical information recording medium even when a focal length is short, because the objective lens satisfies the expression (7) above in the optical pickup device.

Further, since the objective lens has excellent image height characteristics, if the optical pickup device is structured to include that objective lens, it is possible to control manufacturing cost of the optical pickup device to be low, because tolerances for accuracy for installation of a light source and accuracy for installation of optical elements such as a prism and a polarization beam splitter are eased.

Further, a recording and reproducing apparatus of the invention can be structured so that it houses the aforementioned optical pickup device to record a sound and/or an image and/or to reproduce a sound and/or an image.

Incidentally, in the present specification, an objective lens means, in a narrow sense, a lens having a light-converging power arranged to face an optical information recording medium at a location closest to the optical information recording medium under the condition that the optical information recording medium is loaded in the optical pickup device, and it means, in a wide sense, a lens which can be moved together with aforesaid lens by an actuator at least in the direction of an optical axis. Therefore, in the present specification, the numerical aperture of the objective lens on the optical information recording medium side (image side) means a numerical aperture of the lens surface closest to the optical information recording medium on the objective lens. Further, in the present specification, a necessary (and prescribed) numerical aperture is a numerical aperture stipulated by a standard of each optical information recording medium, or a numerical aperture of an objective lens having diffraction limit performance which can obtain a spot diameter necessary for recording or reproducing information in accordance with a wavelength of a light source to be used for each optical information recording medium.

Further, a designed wavelength of the objective lens in the present specification means a wavelength for which the residual aberration of the objective lens is minimum when rays of light each having a different wavelength are made to enter objective lenses under the same conditions (image forming magnification, temperature, a diameter of incident light flux, and so forth).

In the present specification, recording of information means to record information on an information recording surface of the optical information recording medium stated above.

In the present specification, reproducing of information means to reproduce information recorded on an information recording surface of the optical information recording medium stated above.

The objective lens of the invention may be either one to be used for only recording or only reproducing or one to be used for both recording and reproducing. Or, the objective lens may be one to be used for conducting recording for a certain optical information recording medium and for conducting reproducing for another optical information recording medium, or one to be used for conducting recording or reproducing for a certain optical information recording medium and for conducting recording and reproducing for another optical information recording medium. Incidentally, reproducing mentioned here includes only reading information.

DETAILED DESCRIPTION OF THE PREFERRED EMBODIMENT

Figure 3:
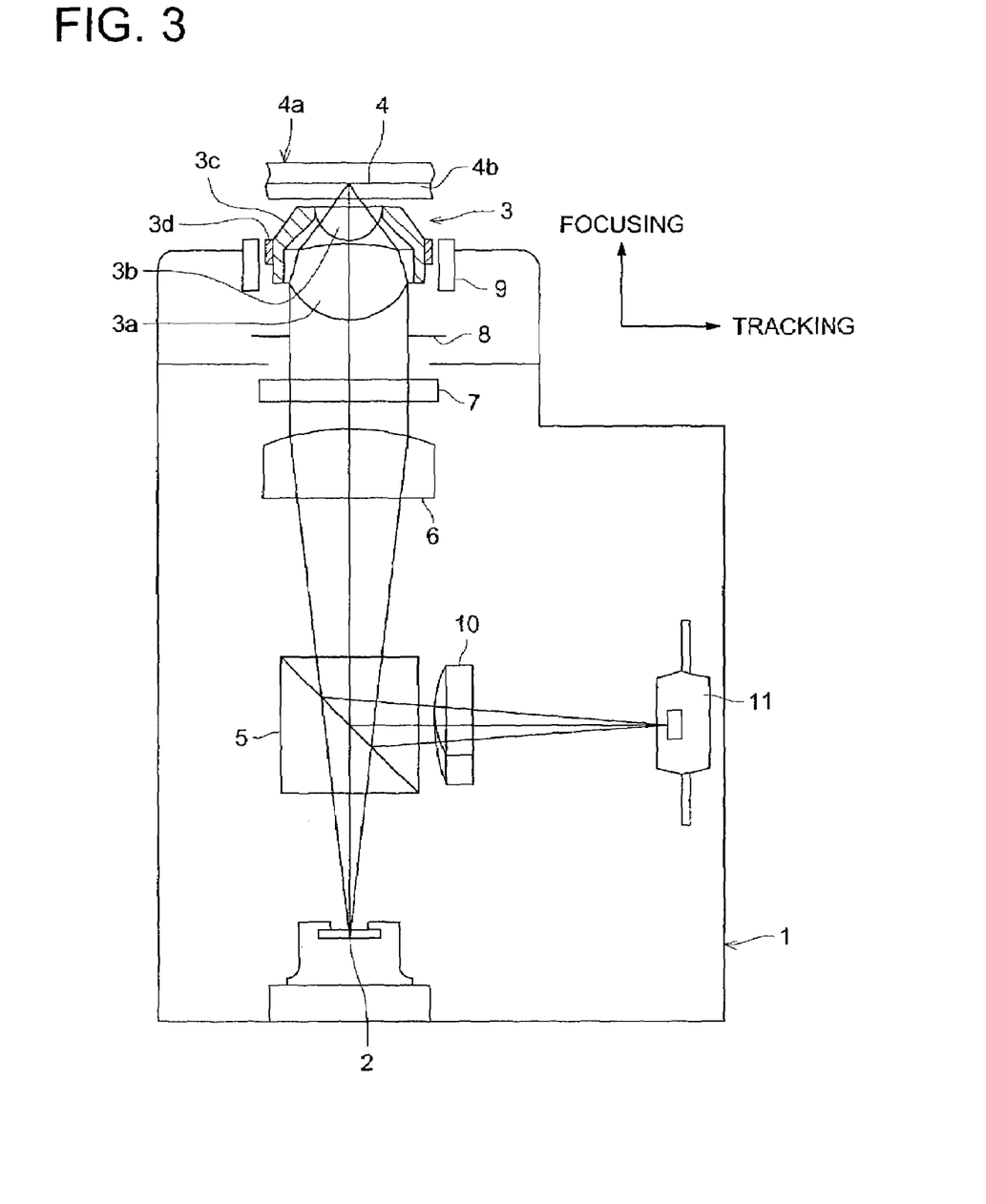
FIG. 3 is a diagram showing schematically the structure of the optical pickup device relating to the present embodiment.

Referring to the drawings, there will be explained an embodiment of the invention as follows. FIG. 3 is a diagram showing the structure of the optical pickup device relating to the present embodiment schematically.

Optical pickup device 1 shown in FIG. 3 is structured to have therein semiconductor laser 2 serving as a light source and objective lens 3 to be capable of conducting, by a laser beam, recording and reproducing for optical disk 4 representing high density DVD.

The semiconductor laser 2 is a GaN violet laser that emits light having a wavelength of about 400 nm. Further, as a light source emitting light having a wavelength of about 400 nm, there may be an SHG violet laser in addition to the GaN violet semiconductor laser.

Objective lens 3 is a lens that converges a light flux emitted from semiconductor laser 2 on information recording surface 4a of optical disk 4, and it is composed of two positive lenses including first lens 3a and second lens 3b, and at least two optical surfaces including an optical surface of the first lens 3a closer to the semiconductor laser and an optical surface of the second lens 3b closer to the semiconductor laser are made to be aspherical surfaces.

The objective lens 3 is of the structure wherein the first lens 3a and the second lens 3b are integrated solidly by lens frame 3c. The objective lens 3 has flange portion 3d that has a surface extending in the direction perpendicular to an optical axis, and this flange portion 3d makes the objective lens 3 to be mounted accurately on optical pickup device 1. The numerical aperture of the objective lens 3 on the optical disk 4 side is made to be 0.80 or more.

The light source side surface of the first lens 3a of the objective lens is the first surface, the optical information recording medium side surface of the first lens is the second surface, the light source side surface of the second lens 3b of the objective lens is the third surface, and the optical information recording medium side surface of the second lens is the fourth surface.

A divergent light flux emitted from semiconductor laser 2 is transmitted through polarization beam splitter 5, to pass through collimator lens 6 and ¼ wavelength plate 7 to become a circularly polarized parallel light flux, then, interfered by diaphragm 8 and formed by the objective lens 3 on information recording surface 4a through protective layer 4b of optical disk 4 representing high density DVD, to become a spot. Objective lens 3 is subjected to focusing control and tracking control conducted by actuator 9 arranged on its periphery.

A reflected light flux modulated by information bits on information recording surface 4a are transmitted again through the objective lens 3, diaphragm 8, ¼ wavelength plate 7 and collimator lens 6 to become a converged light flux, then, reflected by polarization beam splitter 5 and passes through cylindrical lens 10 to be given astigmatism, and is converged in optical detector 11. Then, it is possible to read information recorded on optical disk 4 by the use of output signals of the photo detector 11.

In the optical pickup device shown in FIG. 3, the objective lens 3 is made to be of an infinite conjugate type wherein magnification is zero. However, the objective lens 3 may also be made to be of the so-called finite conjugate type wherein an object point is in a finite position from the objective lens. As an objective lens of a finite conjugate type, an objective lens like one in Example 3 stated later can be used. In this case, a divergent light flux emitted from the semiconductor laser 2 is converged by an objective lens on information recording surface 4a of optical disk 4 without passing through collimator lens 6, thus, the collimator lens 6 is not needed, which is advantageous for reduction of the number of optical parts in optical pickup device 1 and for downsizing of the optical pickup device 1. In the point that the working distance can be lengthened, the finite conjugate type is more preferable.

In the present embodiment, it is possible to control occurrence of longitudinal chromatic aberration caused by dispersion of lens material because a focal length of the objective lens 3 satisfies expression (2). Therefore, even when mode hopping is caused on semiconductor laser 2, excellent light-converging performace can be maintained.

Since the objective lens 3 satisfies the expression (7) above, collision with optical disk 4 can be prevented even when a focal length is small.

Since the objective lens 3 has excellent image height characteristics, tolerances for accuracy for installation of semiconductor laser 2 and accuracy for installation of collimator lens 6 and polarization beam splitter 5 are eased, and as a result, manufacturing cost for optical pickup device 1 can be controlled to be low.

EXAMPLE

The invention will be explained in a concrete form as follows, referring to Examples 1–4 to which, however, the invention is not limited. Incidentally, under the assumption that X represents the direction of an optical axis, h represents a height in the direction perpendicular to the optical axis and r represents a radius of curvature of a refracting interface, an aspheric surface in each lens in the present example is expressed by Numeral 1, wherein, κ represents a circular cone coefficient and $A_{2i}$ represents an aspheric surface coefficient.

$$X = \frac{h^2/r}{1 + \sqrt{1 - (1+\kappa)h^2/r^2}} + \sum_{i=2} A_{2i} h^{2i} \quad \text{(Numeral 1)}$$

Table 1 shows a list of data relating to Examples 1–4 which will be explained as follows. Examples 1–3 represent a plastic lens and Example 4 represents a glass lens. Though an ordinary lens material is used in all Examples, wavefront aberration including defocusing component in the case when a wavelength entering an objective lens changes by 1 nm from designed wavelength is within 0.040 λrms, because the focal length satisfies expression (2) above.

TABLE 1

| Example | 1 | 2 | 3 | 4 |
|---|---|---|---|---|
| Lens material | Plastic | Plastic | Plastic | Glass |
| Numerical aperture NA | 0.85 | 0.85 | 0.85 | 0.85 |
| Designed wavelength λ (nm) | 405 | 405 | 405 | 405 |
| Focal length f (mm) | 0.882 | 0.471 | 0.588 | 0.882 |
| Magnification m | 0 | 0 | −0.09 | 0 |
| Working distance WD (mm) | 0.109 | 0.050 | 0.099 | 0.075 |
| ΔSAG | −0.08 | −0.18 | −0.13 | −0.10 |
| WD/f | 0.12 | 0.11 | 0.17 | 0.09 |
| f1/f2 | 3.00 | 2.90 | 2.63 | 3.00 |
| Magnification βL$_2$ of second lens | 0.30 | 0.26 | 0.26 | 0.29 |
| Wavefront aberration including defocusing component (λrms/nm) | 0.040 | 0.021 | 0.036 | 0.033 |

Incidentally, the wavefront aberration including defocusing component (λrms/nm) in FIG. 1 and Table 1 shows a result of calculation of wavefront aberration under the condition that a focus position of the objective lens is fixed at the best image point position under the designed wavelength of 405 nm, and the wavelength is changed to 406 nm.

Example 1

The objective lens of the present example is composed of two plastic lenses. Table 2 shows data relating to the objective lens in the present example.

TABLE 2

| Surface No. | r (mm) | d (mm) | N | vd | Remarks |
|---|---|---|---|---|---|
| 0 | | ∞ | | | Light source |
| 1 | 1.1130 | 1.2000 | 1.56013 | 56.7 | Objective lens |
| 2 | 3.6173 | 0.0500 | | | |
| 3 | 0.4578 | 0.5500 | 1.56013 | 56.7 | |
| 4 | ∞ | 0.1089 | | | |
| 5 | ∞ | 0.1000 | 1.61950 | 30.0 | Protective layer |
| 6 | ∞ | | | | |

Aspheric surface coefficient

| | First surface | Second surface | Third surface |
|---|---|---|---|
| κ | 3.30027E−01 | 3.36012E+01 | −1.01507E+00 |
| A4 | −9.99307E−02 | −4.19206E−02 | 1.32466E+00 |
| A6 | 1.87100E−01 | 3.12442E−01 | −1.07495E+00 |
| A8 | −8.02387E−01 | −2.10974E+00 | 2.71684E+01 |
| A10 | 1.10451E+00 | −1.04536E+00 | −5.95552E+01 |
| A12 | −6.82472E−01 | | |
| A14 | −3.06111E−01 | | |
| A16 | 1.06640E−01 | | |

In the lens data of Table 2, r (mm) represents a radius of curvature, d (mm) represents a distance between surfaces, N represents a refractive index at a wavelength of 405 nm and vd represents Abbe's number at d line, which also applies to lens data hereafter. Further, in lens data in Table 1, an exponent of 10 (for example, 2.5×10$^{−3}$) is expressed by the use of E (for example, 2.5E−03), which also applies to lens data hereafter.

Example 2

The objective lens of the present example is composed of two plastic lenses. Table 3 shows data relating to the objective lens in the present example.

TABLE 3

| Surface No. | r (mm) | d (mm) | N | vd | Remarks |
|---|---|---|---|---|---|
| 0 | | ∞ | | | Light source |
| 1 | 0.7282 | 0.4900 | 1.56013 | 56.7 | Objective lens |
| 2 | 4.3347 | 0.0250 | | | |
| 3 | 0.2857 | 0.3700 | 1.56013 | 56.7 | |
| 4 | ∞ | 0.0500 | | | |
| 5 | ∞ | 0.1000 | 1.61950 | 30.0 | Information recording surface |
| 6 | ∞ | | | | |

Aspheric surface coefficient

| | First surface | Second surface | Third surface |
|---|---|---|---|
| κ | 5.17599E−01 | 1.12117E+02 | −1.25920E+00 |
| A4 | −6.58773E−01 | −3.50370E−01 | 6.98380E+00 |
| A6 | 8.55197E+00 | 1.55274E+01 | −1.83450E+01 |
| A8 | −7.47658E+01 | −1.37650E+02 | 7.35683E+02 |
| A10 | 2.76780E+02 | 2.01215E+02 | −2.50691E+03 |
| A12 | −4.76986E+02 | | |
| A14 | 4.47487E+02 | | |
| A16 | −3.97197E+03 | | |

Example 3

The objective lens of the present example is composed of two plastic lenses to be of a finite conjugate type. Table 4 shows data relating to the objective lens in the present example.

TABLE 4

| Surface No. | r (mm) | d (mm) | N | vd | Remarks |
|---|---|---|---|---|---|
| 0 | | 6.500 | | | Light source |
| 1 | 0.7669 | 0.8500 | 1.56013 | 56.7 | Objective lens |
| 2 | 6.8648 | 0.0500 | | | |
| 3 | 0.3123 | 0.4500 | 1.56013 | 567 | |
| 4 | ∞ | 0.0989 | | | |
| 5 | ∞ | | | | Protective layer |

Aspheric surface coefficient

| | First surface | Second surface | Third surface |
|---|---|---|---|
| κ | −1.20541E−01 | 0.00000E+00 | −8.20915E−01 |
| A4 | −2.64263E−01 | −9.09843E−02 | 2.83409E+00 |
| A6 | 2.01670E+00 | 8.91198E+00 | −1.78187E+00 |
| A8 | −1.29895E+01 | −7.17118E+01 | 2.38808E+02 |
| A10 | 3.26017E+01 | 1.61550E+02 | −1.00629E+03 |
| A12 | 7.12607E+00 | | |
| A14 | −2.65340E+02 | | |
| A16 | 4.16584E+02 | | |

Example 4

The objective lens of the present example is composed of two glass lenses (BACD 5: made by HOYA Co.). Table 5 shows data relating to the objective lens in the present example.

TABLE 5

| Surface No. | r (mm) | d (mm) | N | vd | Remarks |
|---|---|---|---|---|---|
| 0 | ∞ | | | | Light source |
| 1 | 1.2081 | 1.0000 | 1.60525 | 61.3 | Objective lens |
| 2 | 3.6094 | 0.1000 | | | |
| 3 | 0.5256 | 0.7000 | 1.60525 | 61.3 | |
| 4 | ∞ | 0.0750 | | | |
| 5 | ∞ | 0.1000 | 1.61950 | 30.0 | Protective layer |
| 6 | ∞ | | | | |

Aspheric surface coefficient

| | First surface | Second surface | Third surface |
|---|---|---|---|
| κ | −3.33933E−01 | 6.42072E+00 | −6.86551E−01 |
| A4 | 7.75567E−04 | 1.78622E−02 | 5.07181E−01 |
| A6 | 4.95755E−02 | 3.27677E−01 | 2.76998E−01 |
| A8 | −1.12373E−01 | −1.17645E+00 | 7.56928E+00 |
| A10 | 6.21645E−02 | 4.40036E−01 | −1.36569E+01 |
| A12 | −1.18397E−01 | | |
| A14 | 3.62117E−01 | | |
| A16 | −4.44038E−01 | | |

In the aforesaid examples 1–4, tolerance for decentering and tilt between optical surfaces of each lens are secured to be ±0.005 mm and ±0.1° and tolerance for decentering between respective lenses is secured to be ±0.030 mm by designing so that respective expressions may be satisfied, resulting in the objective lens for which the tolerance for manufacturing is generous and manufacturing is easy in spite of the short focal length and high numerical aperture of that objective lens.

In the aforesaid Examples 1, 2 and 4, spherical aberration has been corrected in accordance with a protective layer thickness of 0.1 mm, and spherical aberration has been corrected in accordance with a protective layer thickness of zero in Example 3, and in the case of an optical disk having a protective layer whose thickness is different from the aforesaid thickness, spherical aberration may be corrected in accordance with a protective layer thickness while satisfying respective expressions mentioned above.

Figure 4:
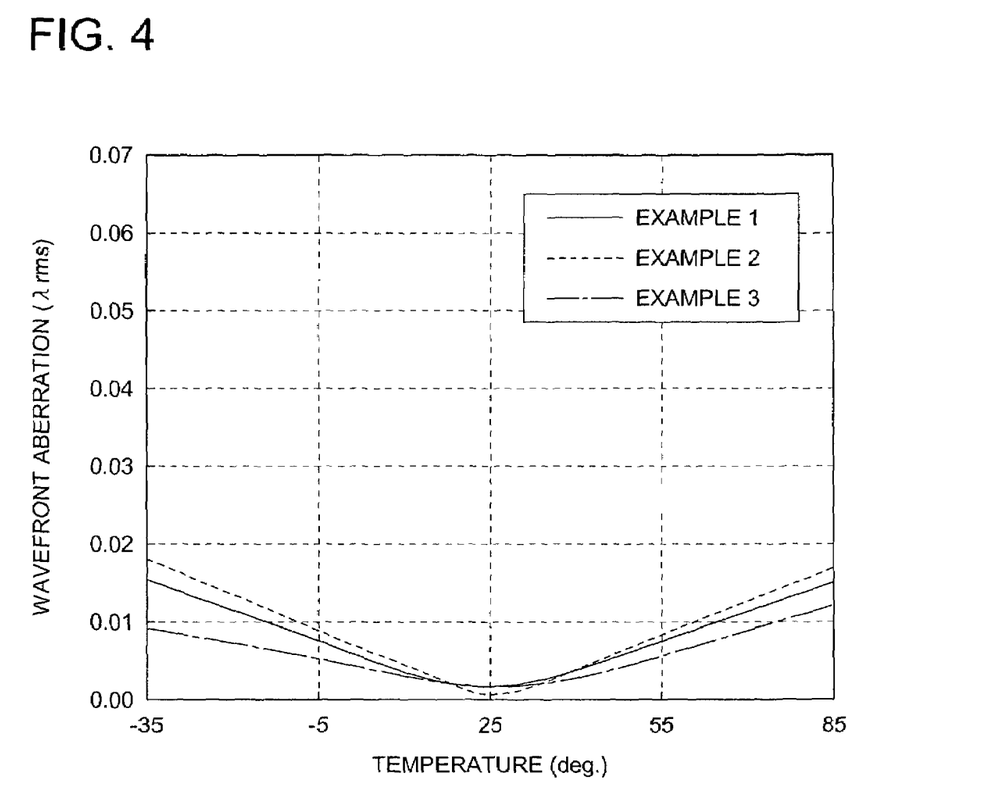
FIG. 4 is a diagram showing wavefront aberration changes for temperature changes concerning objective lenses in Examples 1–3.

FIG. 4 shows how wavefront aberration is changed by temperature changes in the objective lens in each of Examples 1–3. As is apparent from FIG. 4, a focal length of the objective lens in each of Examples 1–3 is made small despite a plastic lens having a high numerical aperture, thereby, a change of wavefront aberration caused by temperature changes can be controlled to be small, resulting in the lens having a broad range of usable temperatures. Incidentally, when calculating wavefront aberration in the case of temperature changes, in FIG. 4, refractive index changes ($-10 \times 10^{-5}$/degree) of a plastic lens caused by temperature changes and wavelength changes (+0.05 nm/degree) of a laser light source were taken into consideration.

Figure 5:
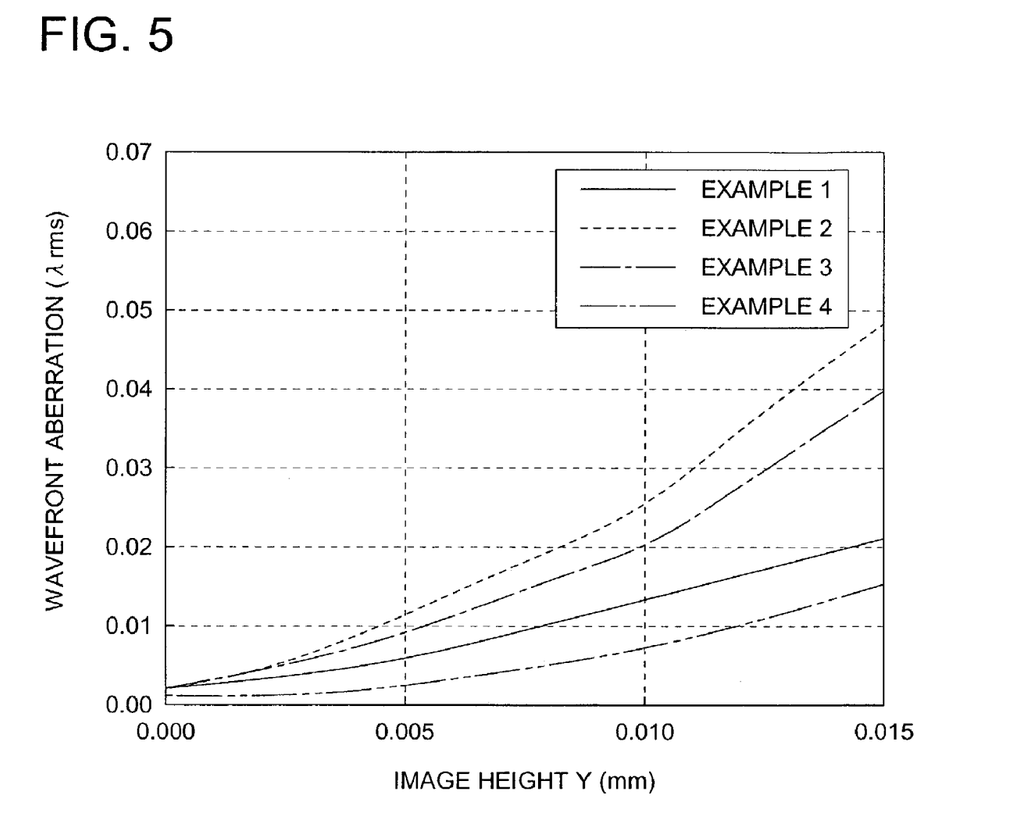
FIG. 5 is a diagram showing image height characteristics of objective lenses in Examples 1–4.

Further, image height characteristics of the objective lens in Examples 1–4 are shown in FIG. 5. As is understood from FIG. 5, the objective lens in each of Examples 1–4 has excellent characteristics in spite of its focal length which is short. Therefore, tolerances for accuracy for installation of a semiconductor laser and accuracy for installation of optical elements such as a collimator lens and a polarization beam splitter are eased, and manufacturing cost for optical pickup devices can be controlled to be low.

The invention makes it possible to provide an objective lens which is of a two-group structure, and is capable of being applied to an optical pickup device employing a light source with short wavelength of about 400 nm and has a numerical aperture of 0.8 or more, wherein a working distance can be secured sufficiently even when a focal length is made to be short for keeping chromatic aberration to be small, and sensitivity for manufacturing errors is low to make manufacturing to be easy and image height characteristics are excellent. It is further possible to provide an optical pickup device housing therein the objective lens and to provide a recording and reproducing apparatus housing therein the optical pickup device.

What is claimed is:

1. An objective lens for use in an optical pickup apparatus for conducing recording information for an optical information recording medium and/or reproducing information recorded in the optical information recording medium by converging a light flux from a light source onto an information recording plane of the optical information recording medium, comprising:

two positive lenses of a first lens arranged at a light source side and a second lens arranged at an information recording medium side;

wherein the objective lens comprises a first surface being a light source side optical surface of the first lens and a third surface being a light source side optical surface of the second lens, and at least two optical surfaces including the first surface and the third surface are made to be an aspherical surface respectively, and the objective lens satisfies the following formulas:

$NA > 0.8$ $1.2 \text{ mm} > f > 0.3 \text{ mm}$ $-0.06 > \Delta SAG > -0.24$ $\Delta SAG = (X1' - X3')/(NA^4 \cdot f \cdot (1 + |m|))$ $X1' = X1 \cdot (N1-1)^3/f_1$ $X3' = X3 \cdot (N2-1)^3/f_2$ where NA is an image side numerical aperture of the objective lens necessary for conducting recording and/or reproducing for the optical information recording medium, f is a focal length (mm) of the objective lens, X1 is a positional difference (mm) in an optical axis direction between a plane which contacts a vertex of the first surface and is perpendicular to the optical axis and a most peripheral portion of the first surface within an effective diameter (the most peripheral portion is a position on the first surface at which a marginal ray on the NA enters), wherein the positional difference has a positive sign when the positional difference is measured from the plane toward the optical information recording medium side and the positional difference has a negative sign when the positional difference is measured from the plane toward the light source side, X3 is a positional difference (mm) in an optical axis direction between a plane which contacts a vertex of the third surface and is perpendicular to the optical axis and a most peripheral portion of the third surface within an effective diameter (the most peripheral portion is a position on the third surface at which a marginal ray on the NA enters), wherein the positional difference has a positive sign when the positional difference is measured from the plane toward the optical information medium side and the positional difference has a negative sign when the positional difference is measured from the plane toward the light source side, m is a magnification of the objective lens, N1 is a refractive index of the first lens for a designed wavelength, N2 is a refractive index of the second lens for a designed wavelength, f1 is a focal length (mm) of the first lens, and f2 is a focal length (mm) of the second lens.

2. The objective lens of claim 1, wherein the objective lens satisfies the following formulas:

$$WD \geq 0.03 \text{ mm}$$

$$0.17 > WD/f > 0.03$$

where WD is a distance (a working distance) between the objective lens and the optical information recording medium.

3. The objective lens of claim 1, wherein the designed wavelength is shorter than 450 nm.

4. The objective lens of claim 1, wherein the objective lens satisfies the following formula:

$$0.4 > \beta_{L2} > 0.2$$

where $\beta_{L2}$ is a magnification of the second lens.

5. The objective lens of claim 1, wherein the objective lens satisfies the following formula:

$$4.0 > f_1/f_2 > 2.0$$

6. The objective lens of claim 1, wherein each of the first lens and the second lens is a plastic lens.

7. The objective lens of claim 1, wherein each of the first lens and the second lens is a glass lens.

8. An optical pickup apparatus for conducing recording information for an optical information recording medium and/or reproducing information recorded in the optical information recording medium by converging a light flux having a wave length shorter than 450 nm from a light source onto an information recording plane of the optical information recording medium, comprising:

the objective lens described in claim 1.

9. An audio and/or image recording and/or audio and/or image recording apparatus, comprising:

the optical pickup apparatus described in claim 8.

* * * * *